US012124595B2

United States Patent
Gehtman et al.

(10) Patent No.: US 12,124,595 B2
(45) Date of Patent: Oct. 22, 2024

(54) DETECTING UNAUTHORIZED ENCRYPTIONS IN DATA STORAGE SYSTEMS

(71) Applicant: EMC IP Holding Company LLC, Hopkinton, MA (US)

(72) Inventors: Yevgeni Gehtman, Modi'in (IL); Tomer Shachar, Omer (IL); Maxim Balin, Gan Yavne (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 472 days.

(21) Appl. No.: 17/181,655

(22) Filed: Feb. 22, 2021

(65) Prior Publication Data
US 2022/0269807 A1 Aug. 25, 2022

(51) Int. Cl.
*G06F 21/62* (2013.01)
*G06F 21/10* (2013.01)
(Continued)

(52) U.S. Cl.
CPC .......... *G06F 21/6218* (2013.01); *G06F 21/10* (2013.01); *G06F 21/64* (2013.01);
(Continued)

(58) Field of Classification Search
CPC ...... G06F 21/62; G06F 21/6218; G06F 21/10; G06F 21/64; G06F 21/56; G06F 21/561;
(Continued)

(56) References Cited

U.S. PATENT DOCUMENTS 7,898,442 B1 * 3/2011 Sovik .................. H03M 7/3088
341/51
8,295,615 B2 * 10/2012 Celi, Jr. .............. H04L 67/1095
382/232

(Continued)

FOREIGN PATENT DOCUMENTS

CN 105760765 A * 7/2016 .......... G06F 21/602
CN 107506642 A * 12/2017
(Continued)

OTHER PUBLICATIONS

Detection of encrypted streams for egress monitoring BY Paras Malhotra pp. 11; Dated (Year: 2007).*

*Primary Examiner* — Eleni A Shiferaw
*Assistant Examiner* — Ali H. Cheema
(74) *Attorney, Agent, or Firm* — Dergosits & Noah LLP; Todd A. Noah

(57) ABSTRACT

At a first time, a system identifies a set of data files which are stored in a part of a data storage system. At a second time, the system identifies each newly encoded data file based on identifying each data file in the set of data files which is encoded and created and/or updated since the first time. The system identifies each compressed data file based on identifying each newly encoded data file which is reduced in size since the first time. The system determines a file compression success rate based on a total count of each compressed data file relative to a total count of each newly encoded data file. If the system determines that the file compression success rate does not satisfy the file compression success rate threshold, the system outputs an alert about an unauthorized encryption in the data storage system.

17 Claims, 3 Drawing Sheets

(51) Int. Cl.
  *G06F 21/64*    (2013.01)
  *G06F 21/56*    (2013.01)
  *G06F 21/78*    (2013.01)

(52) U.S. Cl.
  CPC ............ *G06F 21/561* (2013.01); *G06F 21/78* (2013.01); *G06F 2221/2107* (2013.01)

(58) Field of Classification Search
  CPC ............ G06F 21/78; G06F 2221/2107; G06F 16/1744; G06F 16/148; G06F 16/10
  USPC ............................................. 726/24, 27, 31
  See application file for complete search history.

(56) References Cited

U.S. PATENT DOCUMENTS

| | | | | |
|---|---|---|---|---|
| 8,799,671 | B2* | 8/2014 | Conte | G06F 21/577 |
| | | | | 713/193 |
| 9,720,849 | B2* | 8/2017 | Amarendran | G06N 5/02 |
| 9,880,928 | B1* | 1/2018 | Bono | G06F 3/0608 |
| 10,055,582 | B1* | 8/2018 | Weaver | G06F 21/562 |
| 10,121,003 | B1* | 11/2018 | Adams | G06F 21/565 |
| 2003/0224734 | A1* | 12/2003 | Takekawa | H04L 69/04 |
| | | | | 455/72 |
| 2004/0114634 | A1* | 6/2004 | Liu | H04L 69/04 |
| | | | | 370/252 |
| 2006/0236397 | A1* | 10/2006 | Horne | G06F 21/562 |
| | | | | 726/24 |
| 2009/0136144 | A1* | 5/2009 | Gwak | H04N 19/146 |
| | | | | 382/232 |
| 2009/0210943 | A1* | 8/2009 | Alon | G06F 21/564 |
| | | | | 707/999.2 |
| 2013/0152221 | A1* | 6/2013 | Yin | G06F 21/10 |
| | | | | 726/31 |
| 2014/0347331 | A1* | 11/2014 | Amit | G06T 9/00 |
| | | | | 345/204 |
| 2015/0149789 | A1* | 5/2015 | Seo | G06F 3/064 |
| | | | | 713/193 |
| 2015/0256843 | A1* | 9/2015 | Roskowski | H04N 19/91 |
| | | | | 382/246 |
| 2015/0293934 | A1* | 10/2015 | Huang | G06F 16/1744 |
| | | | | 707/693 |
| 2015/0350137 | A1* | 12/2015 | Brown, Jr. | H04L 51/212 |
| | | | | 709/206 |
| 2016/0092206 | A1* | 3/2016 | Deng | G06F 9/445 |
| | | | | 717/120 |
| 2017/0048556 | A1* | 2/2017 | Drako | H04N 19/91 |
| 2017/0168726 | A1* | 6/2017 | Nicol | G06F 8/00 |
| 2017/0244962 | A1* | 8/2017 | Roskowski | H04N 7/188 |
| 2017/0336984 | A1* | 11/2017 | Nicol | G06F 3/0661 |
| 2017/0336995 | A1* | 11/2017 | Nicol | G06F 11/302 |
| 2017/0357457 | A1* | 12/2017 | Bushman | H03M 7/40 |
| 2018/0159866 | A1* | 6/2018 | Sheri | G06F 21/566 |
| 2019/0108340 | A1* | 4/2019 | Bedhapudi | G06F 21/554 |
| 2019/0294507 | A1* | 9/2019 | Linnen | G06F 17/18 |
| 2020/0192671 | A1* | 6/2020 | Das | G06F 12/0871 |
| 2020/0236328 | A1* | 7/2020 | Drako | H04N 19/80 |
| 2020/0344315 | A1* | 10/2020 | Kumar | H03M 7/6011 |
| 2021/0049277 | A1* | 2/2021 | Mueller-Wicke | G06F 21/568 |
| 2021/0216631 | A1* | 7/2021 | Child | G06F 21/564 |
| 2021/0350007 | A1* | 11/2021 | Shih | G06F 21/6218 |
| 2022/0245245 | A1* | 8/2022 | Annen | G06F 16/128 |

FOREIGN PATENT DOCUMENTS

| | | | | |
|---|---|---|---|---|
| CN | 109684836 | A * | 4/2019 | ........... G06F 21/552 |
| CN | 112639787 | A * | 4/2021 | ........... G06F 16/122 |
| JP | 2004295564 | A * | 10/2004 | |
| JP | 2019532388 | A * | 11/2019 | |
| WO | WO-2006027775 | A2 * | 3/2006 | ........... G06F 21/564 |
| WO | WO-2017223114 | A1 * | 12/2017 | ............. G06F 16/00 |

* cited by examiner

DETECTING UNAUTHORIZED ENCRYPTIONS IN DATA STORAGE SYSTEMS

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup file(s) for that state to the data object.

A data storage system may store a data object on a storage array, which may be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and store the backup files of data objects on multiple storage arrays.

Since data storage systems' primary storage for data objects has become cheaper over time, enterprises typically store many versions of the same data objects so that workers can reuse previously completed work. Therefore, operations such as creating backup copies of data objects in a data storage system can require repeatedly copying and storing the same data objects multiple times for possible recovery over 30- to 90-day periods, which may result in storing large amounts of extremely redundant data. Repeatedly storing the same data objects can consume unnecessary storage space on a data storage system's disks and/or tapes, electricity to power and cool the disks and/or tape drives, and bandwidth for transferring the data objects, which creates a chain of cost and resource inefficiencies within an enterprise.

Since eliminating redundant data objects can significantly shrink a data storage system's storage requirements and improve its bandwidth efficiency, data compression processes are ideal for highly redundant operations such as creating backup copies of a data storage system's data objects. As a result, enterprises of all sizes typically combine data compression processes with backup and recovery processes, which can result in a significant reduction of the size of the data objects stored in the back end of a data storage system, which increases the available storage in the back end, and makes the back end more space efficient and cost effective. A data compression process can lower a data storage system's costs because fewer disks and/or tape drives are needed, and can improve the backup and recovery processes, because far less data objects are required to be transferred and a reduced size data object may be transferred faster than its original size data object.

In addition to compressing data objects for storage, a data storage system can use an encryption algorithm to provide additional security for at least some of the data objects stored on a storage array. Data that has been saved to persistent storage in a data storage system may be referred to as data at rest, which is generally encrypted by an encryption algorithm. Encryption algorithms may be applied at different layers in a data storage system. For example, encryption can be configured at the disk layer, on a subset of a disk called a partition, on a volume, which is a combination of disks or partitions, at the layer of a file system, on a single data file, or within user space applications such as a database, or other applications that run on the host operating system.

Encryption algorithms include symmetric encryption algorithms and asymmetric encryption algorithms. In symmetric encryption, a sender of an encrypted data object shares a private key with a receiver of the encrypted data object, which enables the receiver to decrypt the encrypted data object. Sharing the private key with the receiver of the encrypted data object creates a risk that cyber criminals can get the private key and decrypt the encrypted data object. By using only one private key, a symmetric encryption algorithm is typically faster at encrypting and decrypting data objects than an asymmetric encryption algorithm, which uses one public key and one private key to encrypt and decrypt data objects.

The following are examples of some of the most frequently used symmetric encryption algorithms. The Triple Data Encryption Standard algorithm, or Triple-DES, is a symmetric encryption algorithm that uses a 56-bits key three times to encrypt a data object, decrypt the encrypted data object, and re-encrypt the decrypted data object, effectively using a 168-bit key. Similarly, the Triple-DES decryption phases are to decrypt an encrypted data object, re-encrypt the decrypted data object, and decrypt the re-encrypted data object. Since the 56-bits key is used three times in both the encryption phase and the decryption phase, the Triple-DES algorithm typically processes data objects much slower than many other types of symmetric encryption algorithms.

The Advanced Encryption Standard (AES) algorithm is a symmetric encryption algorithm that uses 128-bits, 192-bits, or 256-bits random numbers as keys to encrypt one fixed-size data object block at a time. To encrypt every bit, the AES algorithm applies its key in rounds, such as the 128-bits key is applied in 10 rounds, the 192-bits key is applied in 12 rounds, and so on. The Blowfish algorithm is a symmetric encryption algorithm which uses a variable length key from 32 bits to 448 bits, and which divides a data object into fixed 64-bits blocks when encrypting and decrypting.

The Twofish algorithm is a symmetric encryption algorithm which has a key length and block size of 128-bits that can extend to the 256-bits. The Twofish algorithm breaks data objects into fixed length blocks and applies its key in 16 rounds regardless of the size of the data object. The Twofish algorithm is flexible by allowing a user to choose for the encryption process to be quick while the key setup to be slow, and vice versa.

In contrast to symmetric encryption algorithms, an asymmetric encryption algorithm divides a secret key into two parts, which are a public key and a private key. The public key can be given to anyone, trusted or not, while the private key is kept secret, like the single key used in symmetric encryption algorithms. Due to using two keys, the unauthorized decryption of data objects encrypted by an asymmetric encryption algorithm is significantly more difficult than the unauthorized decryption of data objects encrypted by a symmetric encryption algorithm. Using an asymmetric encryption algorithm, data objects or messages are signed with a private key, and then anyone with the public key can verify that the data object or message was created by someone possessing the corresponding private key. This can be combined with a proof of identity system to know what entity, person, or group, owns that private key, thereby providing authentication.

When using an asymmetric encryption algorithm, someone with the public key can encrypt a data object or a message, providing confidentiality, and then only the person in possession of the private key can decrypt the encrypted data object or message. The Rivest-Shamir-Adleman (RSA) encryption algorithm is an asymmetric algorithm that functions on a 1024-bits key and can extend up to a 2048-bits key, such that the larger the key size, the slower the encryption process becomes. Other asymmetric algorithms include Ed25519 signing, X25519 key exchange, Ed448 signing, X448 key exchange, Elliptic curve cryptography, Diffie-Hellman key exchange, Key Serialization, and Asymmetric Utilities.

Different types of encryption algorithms may also be used by a type of software that is known as malware. The development and deployment phases for malware may be described as phases of an intrusion kill chain. In the reconnaissance phase, a potential attacker researches, identifies, and selects targets. During the weaponization phase, the potential attacker pairs remote access malware with a deliverable payload, such as Microsoft Office files or Adobe PDF files, to create a malware weapon. In the delivery phase, the potential attacker transmits the malware weapon to the target, such as via an email attachment, a website, or a USB drive.

During the exploitation phase, the delivered malware weapon's code is triggered, thereby exploiting vulnerable applications and/or systems. In the installation phase, the malware weapon installs an alternative communication channel on the target which enables persistent access via the attacker's external server. During the command-and-control phase, the attacker's external server communicates with the malware weapon and provides the attacker with access inside the target's network. In the actions on objective phase, the attacker works to achieve the objective of the intrusion, which can include exfiltration, destruction, or encryption of the target network's data, or the intrusion of another target.

Attacks by malware which is known as ransomware are typically initiated by software disguised as a legitimate file which a user is tricked into downloading or opening when it arrives as an email attachment. Ransomware can infect a data storage system and its sensitive, designated, and core areas, encrypt the infected data storage system's files, and then extort the data storage system's owner or user to pay a ransom to decrypt the encrypted data files. Examples of ransomware which use encryption algorithms include Cryptolocker/Crypt0L0cker, Cesar, Arena, Lukitus, Aleta, Gryphon, Nemesis, Dharma, Australia Post Cryptolocker, AGL Cryptolocker, FBI Virus, CTB Locker, Teslacrypt, Virus data recovery, Malware data recovery, BTCWare, Purge, Cerber, Blackout, Mircop, Locky, Lockrypt, Master, Emergency Ransomware Recovery, and +++more. The CryptoLocker ransomware and its related ransomware family were not the first file encrypting ransomware, but they were the first major ransomware family that gained widespread media attention. Many other ransomware families follow the CryptoLocker ransomware's operational phases.

The CryptoLocker ransomware uses an AES symmetric encryption 256 bits key for the actual file encryption, and an asymmetric RSA asymmetric encryption public key for communication and securing the AES symmetric encryption 256 bits key. After arriving in a data storage system, the CryptoLocker ransomware uses the RSA asymmetric encryption public key to establish a secure communication channel to the ransomware's command and control server, which prevents any third-party, such as a malware analyst who is sampling network traffic, from decrypting the encrypted communications. Establishing the secure communication channel to the ransomware's command and control server prevents a law enforcement agency from issuing its own commands to take over control of the CryptoLocker ransomware.

During the encrypted communications, the CryptoLocker ransomware requests the ransomware's command and control server to provide a second RSA asymmetric encryption public key which is unique to the victim, and then creates an AES symmetric encryption 256 bits key to encrypt the victim's data files. Since the RSA asymmetric encryption algorithm functions relatively slow when directly encrypting large amounts of data, the CryptoLocker ransomware uses the AES symmetric encryption 256 bits key that functions relatively fast to encrypt most of the victim's data files. As a final step, the CryptoLocker ransomware uses the victim-specific RSA asymmetric encryption public key to encrypt the AES symmetric encryption 256 bits key, and then stores the encrypted AES symmetric encryption 256 bits key together with the encrypted data files.

When the encryption process finishes, the CryptoLocker ransomware erases the AES symmetric encryption 256 bits key from its memory, making sure no trace is left anywhere. Only the victim-specific RSA asymmetric encryption public key, which is only stored only on the ransomware's command and control server, can decrypt the victim's AES symmetric encryption 256 bits key from within the encrypted data files, which can then be used to decrypt the encrypted data files after the victims have paid the ransom. The CryptoLocker ransomware leverages the advantages of both asymmetric encryption algorithms and symmetric encryption algorithms to encrypt the victim's data files within a matter of seconds, rather than hours, such that recovering the encrypted data files without paying the ransom is almost impossible.

DETAILED DESCRIPTION

Inserting any proactive security system in a data storage system can significantly diminish the performance of the data storage system. Therefore, data storage systems are designed as closed systems which do not use a proactive security system to monitor internal processes, such as a ransomware encrypting a data storage system's data files. Most data storage system's security methods are limited to using policies and regulations to prevent data theft or data leakage. Consequently, once infected, a typical data storage system cannot stop ransomware from encrypting files because the data storage system cannot detect and differentiate between its own operating system's authorized encryption processes and the ransomware's unauthorized encryption processes.

Embodiments herein enable detecting unauthorized encryptions in data storage systems. At a first time, a system identifies a set of data files which are stored in a part of a data storage system. At a second time, the system identifies each newly encoded data file based on identifying each data file in the set of data files which is both encoded and also created or updated since the first time.

Then the system identifies each compressed data file based on identifying each newly encoded data file which is reduced in size since the first time. The system determines a file compression success rate based on the total count of each compressed data file relative to the total count of each newly encoded data file. If the system determines that the file compression success rate does not satisfy a file compression success rate threshold, then the system outputs an alert about an unauthorized encryption.

For example, at 9:00 A.M. a monitoring tool identifies ten data files which are stored in a folder in a data storage system. At 9:01 A.M. the monitoring tool identifies ten newly encoded data files in the same folder by identifying ten data files which were either created or updated in the folder and also encoded (either encrypted or compressed) since 9:00 A.M. The monitoring tool identifies zero compressed data files in the same folder by identifying that none of the ten newly encoded data file was reduced in size since 9:00 A.M. The monitoring tool determines a file compression success rate of 0% for the folder by dividing zero, which is the number of the compressed data files in the folder, by ten, which is the number of the newly encoded data files in the folder. Since the file compression success rate of 0% for the folder is less than the historical average of the file compression success rate threshold of 99.99% for the folder, the monitoring tool outputs an alert about ten unauthorized encryptions of data files in the folder.

Figure 1:
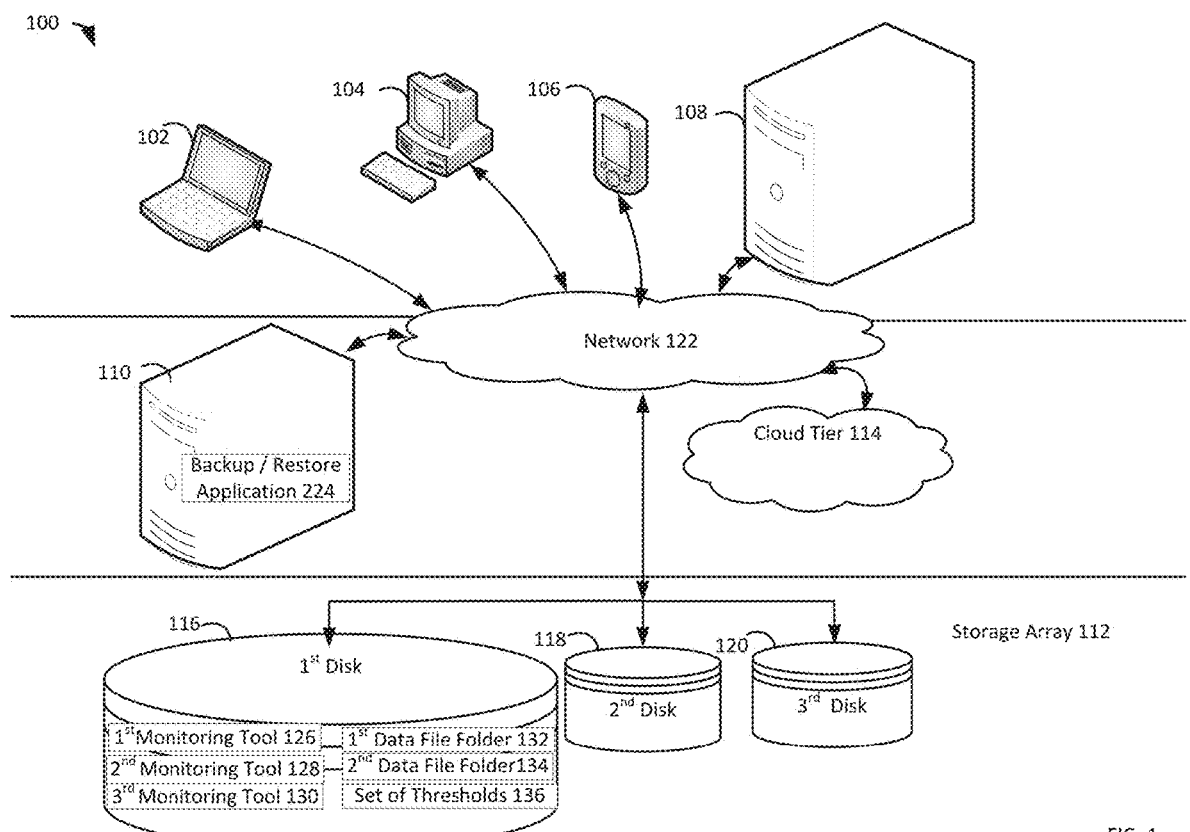
FIG. 1 illustrates a block diagram of an example system for detecting unauthorized encryptions in data storage systems, under an embodiment.

FIG. 1 illustrates a diagram of a system 100 for detecting unauthorized encryptions in data storage systems, under an embodiment. As shown in FIG. 1, the system 100 may illustrate a cloud computing environment in which data, applications, services, and other application resources are stored and delivered through shared data centers and appear as a single point of access for the users. The system 100 may also represent any other type of distributed computer network environment in which servers control the storage and distribution of application resources and services for different client users.

In an embodiment, the system 100 represents a cloud computing system that includes a first client 102, a second client 104, a third client 106, and a fourth client 108, and a server 110, a storage array 112, and a cloud tier 114 that may be provided by a hosting company. The storage array 112 may include a first disk 116, a second disk 118, and a third disk 120. The clients 102-108, the server 110, the storage array 112, and the cloud tier 114 communicate via a network 122.

Although FIG. 1 depicts the first client 102 as a laptop computer 102, the second client 104 as a personal computer 104, the third client 106 as a smartphone 106, and the fourth client 108 as a server 108, each of the clients 102-108 may be any type of computer. Even though FIG. 1 depicts the system 100 with four clients 102-108, one server 110, one storage array 112, one cloud tier 114, three disks 116-120, and one network 122, the system 100 may include any number of clients 102-108 any number of servers 110, any number of storage arrays 112, any number of cloud tiers 114, any number of disks 116-120, and any number of networks 122. The clients 102-108 and the server 110 may each be substantially like the system 300 depicted in FIG. 3 and described below.

The server 110, which may be referred to as a backup server 110, includes a backup/restore application 124 that can create backup files of data objects for the clients 102-108, and execute a restore based on the backup files stored on the storage array 112 and/or the cloud tier 114. The backup/restore application 124 can provide centralized administration, such as scheduling, monitoring, and managing backup operations and backup files. The backup/restore application 124 can enable the storing of backup operation schedules, client policies, and client configurations. The backup/restore application 124 can provide a unique interface to the clients 102-108 during login, and assist the backup server 110 in authenticating and registering the clients 102-108.

The backup/restore application 124 can send backup/restore work orders to the clients 102-108, which can receive and process the work orders to start a backup or restore operation. The backup/restore application 124 can maintain a local database of all processes that execute on the backup server 110. The backup/restore application 124 can execute server-side processes for a system administrator's graphical management console, which may enable the system administrator to use command line interface tools for queries. For example, a system administrator identifies the clients 102-108 registered with the backup server 110.

At least parts of the clients 102-108, the backup serer 110, the storage array 112, the cloud tier 114, and the network 122 can collectively comprise a data storage system, which may use an encryption algorithm to store at least some of its data, such as the AES symmetric encryption algorithm that uses 128-bits, 192-bits, or 256-bits random numbers as keys to encrypt data objects one fixed-size block at a time The first disk 116 in the storage array 112 can include a first monitoring tool 126, a second monitoring tool 128, a third monitoring tool 130, a first data file folder 132, a second data file folder 134, and a set of thresholds 136. Although FIG. 1 depicts three monitoring tools 126-130, two data file folders 132-134, and one set of thresholds 136 residing completely on the backup server 110, any number of each of the monitoring tools 126-130, the data file folders 132-134, and the set of thresholds 136 may reside in any combination of partially on the backup server 110, partially on another server which is not depicted in FIG. 1, partially on the cloud tier 114, and partially on the clients 102-108.

Since the monitoring tools 126-130 can monitor a data storage system's parameters, the system 100 deploys the monitoring tools 126-130 into areas for the data storage system's critical components and sensitive data, which include areas where authorized encryption may occur by the data storage system's operating system. The monitoring tools 126-130 provide the capability to detect unauthorized encryption, which may be an attack by ransomware, and report the unauthorized encryption to a user, such as a system administrator, which enables the user to respond to security issues and potential security risks. The monitoring tools 126-130 can detect and differentiate between authorized and unauthorized encryption processes within a data storage system, components and designated areas, without impairing any of the data storage system's performance.

In contrast to a data storage system's limited use of authorized encryptions, when infecting a data storage system ransomware does not stop encrypting files in a data storage system's folder until all files in the folder are encrypted, and then the ransomware continues encrypting files when any files are added to the folder. Therefore, other than the relatively few files in a folder which may be locked against encryption by a data storage system's operating system, the ransomware encrypts all the files in the data storage system's folders. Since a data storage system is designed to perform any file compression process on unencrypted files only, and not on any encrypted files, the monitoring tools 126-128 can monitor any changes in the sizes, or the footprints, of new data files in a folder to determine whether any data files in the folder have reduced in size and therefore have been compressed.

To establish a baseline for comparing a folder's data files over time, at a first time the system 100 identifies a set of data files which are stored in a part of a data storage system. For example, at 9:00 A.M. the first monitoring tool 126 identifies ten data files which are stored in the first data file folder 132 in a data storage system. In another example, at 9:00 A.M. the second monitoring tool 128 identifies ten data files which are stored in the second data file folder 134 in the data storage system.

A time can be a clearly identified chronological point as measured in hours and minutes past midnight or noon. A set can be a group of entities, such as a folder of data files. A data file can be a persistent record of binary information. Although examples describe a set as a folder which includes data files. a set can be a section of such a folder or a collection of such folders. A part can be a piece of a system such as a component or an area, which combined with other pieces makes up the whole system. A data storage system can be hardware and/or software that retains information.

Ransomware can either modify an unencrypted file in a folder by overwriting the unencrypted file with the newly encrypted version of the previously unencrypted file or add the newly encrypted version of the previously unencrypted file to the folder and then delete the original unencrypted file. Therefore, the monitoring tools 126-128 can monitor the relatively small number of write commands that can either create a new data file in a folder or update an existing data file in the folder, rather than monitoring the relatively large number of read commands which do not directly result in creating or updating any data files in a folder. The monitoring tools 126-128 can identify data files that were added to or updated in a folder by tracking all the write commands to the folder or by identifying each timestamp for a data file in the folder which is greater than the previous most recent timestamp for the data file in the folder.

The authorized encryption of an unencrypted data file typically creates a new encrypted data file and renames the file with the previously unencrypted file's name combined with a name extension that identifies the new data file as an encrypted data file. While some ransomware may add such an identifying name extension to each name of each data file which the ransomware encrypts, not all ransomware adds such name extensions which would enable the monitoring tools 126-128 to identify the unauthorized encryption of data files. Consequently, the monitoring tools 126-128 can identify the unauthorized encryption of data files by using other attributes of encrypted data files, such as the highly random data which is produced by the encryption of data in a file. Therefore, if one of the monitoring tools 126 or 128 reads a new file's data which is highly random data, such as data which an entropy test identifies as high entropy data, then the monitoring tool 126 or 128 could categorize the new data file as an encrypted data file.

However, compression of a data file and encryption of a data file both encode data as highly random data in a new file. Therefore, when one of the monitoring tools 126 or 128 reads a new file's data which is highly random data, the monitoring tool 126 or 128 cannot quickly determine if such an encoded data file is a compressed data file or an encrypted data file because a significant amount of time may be required to correctly decompress or decrypt the encoded data file. Consequently, the monitoring tools 126-128 can categorize the status of such a data file as encoded, which means that the file's data is encrypted and/or compressed. In contrast, if new file's data is not highly random data, the monitoring tool 126 or 128 can categorize the status of such a data file as none, which means that the file's data is neither encrypted nor compressed.

After identifying a set of data files at a first time, at a second time the system 100 identifies each newly encoded data file based on identifying each data file in the set of data files which is encoded and is created or updated since the first time. For example, at 9:01 A.M. the first monitoring tool 126 identifies ten newly encoded data files in the first folder 132 by identifying that all ten data files were modified in the first folder 132 since 9:00 A.M. and were also categorized as encoded, which means that the ten files' data was encrypted and/or compressed. In another example, at 9:01 A.M. the second monitoring tool 128 identifies five newly encoded data files in the second folder 134 by identifying that five of the ten data files were changed in the second folder 134 since 9:00 A.M. and were also categorized as encoded, which means that the five files' data was encrypted and/or compressed. A newly encoded data file can be a persistent record of binary information which is recently converted to a particular format. Encoded can be converted to a particular format. Created can be initiated. Updated can be modified.

While compression of a data in a file almost always results in reducing the size of the data file, typically reducing the size of the data significantly, encryption of a data in a file almost always results in maintaining the size of the data in the file, and occasionally increasing the size of the data slightly. Therefore, the monitoring tools 126-128 can use the size of each newly encoded data file to determine which newly encoded data files are recently compressed data files and which newly encoded data files are recently encrypted data files. Following the identification of each newly encoded data file in the set, the system 100 identifies each compressed data file based on identifying each newly encoded data file which is reduced in size since the first time. For example, the first monitoring tool 126 identifies zero compressed data files by identifying that none of the ten newly encoded data files in the first data files folder 132 was reduced in size since 9:00 A.M., based on a comparison to the ten newly encoded files' previous sizes.

In another example, the second monitoring tool 128 identifies five compressed data files by identifying that all five of the newly encoded data files in the second data files folder 134 were reduced in size since 9:00 A.M., based on a comparison to the five newly encoded files' previous sizes. A compressed data file can be a persistent record of binary information which is reduced in size. A size can be the overall dimensions or magnitude of an entity.

Since ransomware encrypts all the files in a data storage system's folders, and encrypting data files does not reduce their sizes, the monitoring tools 126-128 can use the percentage of the newly encoded data files in a folder which were reduced in size as a probable indicator of whether the newly encoded data files are recently compressed data files or recently encrypted data files. If a relatively high percentage of the newly encoded data files in a folder were reduced in size, then the monitoring tools 126-128 can identify the newly encoded data files as recently compressed data files.

If a relatively low percentage of the newly encoded data files in a folder were reduced in size, then the monitoring tools 126-128 can identify the newly encoded data files as recently encrypted data files.

Having identified each compressed data file in a set of data files, the system 100 determines a file compression success rate based on the total count of each compressed data file relative to the total count of each newly encoded data file. For example, the first monitoring tool 126 determines a file compression success rate of 0% for the first data files folder 132 by dividing zero, which is the number of the compressed data files in the first data files folder 132, by ten, which is the number of the newly encoded data files in the first data files folder 132. In another example, the second monitoring tool 126 determines a file compression success rate of 100% for the second data files folder 134 by dividing five, which is the number of the compressed data files in the second data files folder 134, by five, which is the number of the newly encoded data files in the second data files folder 134. A file compression success rate can be a percentage of records which were reduced in size. A total count can be an aggregated numerical measure.

After determining the file compression success rate for a folder, the system 100 determines if the data storage system is behaving normally based on whether the file compression success rate for the folder satisfies a file compression success rate threshold for the folder. For example, the first monitoring tool 126 determines whether the file compression success rate of 0% for the first data files folder 132 is greater than or equal to 89.99%, which is the historical average of the file compression success rate of 99.99% for the first data files folder 132 minus 10%. In another example, the second monitoring tool 128 determines whether the file compression success rate of 100% for the second data files folder 134 is greater than or equal to 89.99%, which is the historical average of the file compression success rate of 99.99% for the second data files folder 134 minus 10%. Although these examples describe using an allowed variation of minus 10% when determining whether a file compression success rate satisfies a file compression success rate threshold, the monitoring tools 126-128 may add, subtract, multiply or divide any value in combination with a historical threshold when making such determinations, and such a value may be calculated in any way.

A file compression success rate threshold can be the magnitude that a percentage of records which were reduced in size must satisfy for a certain result to occur. The file compression success rate threshold may be based on any number of file compression success rates associated with any user and/or any part of the data storage system. A user can be a person who operates a computer. For example, in some embodiments a file compression success rate threshold may be based on a user's most recent and historical file compression success rates rather than based only on a folder's most recent and historical file compression success rates.

If the file compression success rate for a folder does not satisfy the file compression success rate threshold for the folder, the system 100 outputs an alert about an unauthorized encryption for the folder. For example, the first monitoring tool 126 determines that the file compression success rate of 0% for the first data files folder 132 is not greater than or equal to 90%, which is the most recent file compression success rate of 100% for the first data files folder 132 minus 10%, and is not greater or equal to 89.99%, which is the historical average of the file compression success rate threshold of 99.99% for the first data files folder 132 minus 10%. Therefore, the first monitoring tool 126 determines that the ten newly encoded data files were ten unauthorized encryptions of data files and outputs an alert about ten potential unauthorized encryptions of data files in the first data files folder 132.

In an alternative example, the first monitoring tool 126 determines that the file compression success rate of 0% for the first data files folder 132 is greater than or equal to 0%, which is the most recent file compression success rate of 0% for the first data files folder 132 minus up to 10%, and greater than or equal to 0%, which is the historical average of the file compression success rate threshold of 0.01% for the first data files folder 132 minus up to 10%. Therefore, the first monitoring tool 126 determines that the ten newly encoded data files were ten authorized encryptions of data files because the first data files folder 132 has historically stored and encrypted data files. An alert can be a warning message. An unauthorized encryption can be an illegitimate conversion of data into a code which restricts reading access.

In another example, since the file compression success rate of 100% for the second data files folder 134 is greater than or equal to 90%, which is the most recent file compression success rate of 100% for the second data files folder 134 minus 10%, and greater than or equal to 89.99%, which is the historical average of the file compression success rate threshold of 99.99% for the second data files folder 134 minus 10%, the second monitoring tool 128 determines that the five newly encoded data files were five data compressions of data files and therefore continues by monitoring data files in other folders. The monitoring tools 126-128 protect the data storage system's storage devices against ransomware attacks by providing real-time detection during run-time of unauthorized encryptions via determining the file compression success rate for various data file folders.

Since the monitoring tools 126-128 monitor the new sizes and the previous sizes of newly encoded data files that are compressed in a folder, the monitoring tools 126-128 can calculate the amount of data storage that has been saved in the folder due to data compression, and then present this savings to system users as a data compression ratio and a data reduction amount via a capacity report. Since identifying each compressed data file which is reduced in size since the first time includes identifying a corresponding first size at the first time and a corresponding second size at a second time, the monitoring tools 126-128 can aggregate each corresponding first size and each corresponding second size, and then output a ratio of the aggregated second size to the aggregated first size and a difference between the aggregated second size and the aggregated first size. For example, in addition to calculating and outputting the file compression success rate of 100% for the second data files folder 134, the second monitoring tool 128 determines that the five compressed data files in the second data files folder 134 require 1 Megabyte (MB) of storage on the first disk 116, and as five uncompressed files originally required 3 MB of storage on the first disk 116. Therefore, the second monitoring tool 128 reports that the data compression for the second data files folder 134 saved 2 MB of storage on the first disk 116 at a 3:1 compression ratio.

The compression ratio may reflect a different value than expected due to the performance optimization leaving compressible data uncompressed such that the calculated percentage of compressed data files in a folder is less than 100 percent. A ratio can be the relationship in quantity, amount, or size between two entities. An aggregated size can be the overall dimensions or magnitudes which are combined for parts of an entity or for multiple entities. A difference can be the remainder left after subtraction of one value from another value.

In addition to determining a file compression success rate to protect a data storage system from ransomware attacks, the monitoring tool 130 offer additional security functionality which can verify whether the data storage system may be experiencing unauthorized encryption, not only by ransomware, but by elevated-users' misplaced configurations-in this case, encrypting data files in a folder. The monitoring tool 130 can provide an advanced methodology for breaking or terminating the malware intrusion kill chain at phase 4, exploitation, by terminating access by a detected hostile presence on a vulnerable data storage system. The monitoring tools 126-130 can reinforce hardware/software tempering protection by monitoring each user's number of concurrent connections to a data storage system and each user's number of concurrent sessions interacting with the data storage system. Then the monitoring tools 126-130 can compare these concurrent parameters for each user to the user's historical numbers of concurrent connections to the data storage system and each user's historical numbers of concurrent sessions interacting with the data storage system, which can detect deviations between users' historically normal behavior and current users' abnormal behavior.

The system 100 can identify a total count of concurrent connections between the data storage system and any clients which are associated with a user. For example, the third monitoring tool 130 identifies the 3 concurrent connections between the data storage system and the first user's client 102. In another example, the third monitoring tool 130 identifies 1 connection between the data storage system and the second user's client 104. Concurrent connections can be contemporaneous links between communicating devices. A client can be a networked computer that can obtain information and/or applications from a server.

After determining the total count of concurrent connections by a user, the system 100 can determine whether the total count of concurrent connections by the user satisfies a concurrent connections threshold. For example, the third monitoring tool 130 determines whether the 3 concurrent connections by the first user is greater than or equal to 2.2, which is 2.0 multiplied by the historical average of 1.1 concurrent connections by the first user. In another example, the third monitoring tool 130 determines whether the 1 connection by the second user is greater than or equal to 2.2, which is 2.0 multiplied by the historical average of 1.1 concurrent connections by the second user. Although these examples describe using an allowed variation of multiplication factor of 2.0 when determining whether the number of a user's concurrent connections satisfies a historical concurrent connections threshold, the monitoring tools 126-130 may add, subtract, multiply or divide any value in combination with a historical threshold when making such determinations, and such a value may be calculated in any way.

A concurrent connections threshold can be the magnitude which must be satisfied by the number of contemporaneous links between communicating devices for a certain result to occur. A concurrent connections threshold may be based on any number of total counts of concurrent connections associated with a user and/or a data storage system. For example, in some embodiments a concurrent connections threshold may be based on the data storage system's most recent and historical number of concurrent connections rather than based only on a user's most recent and historical number of concurrent connections.

If the total count of concurrent connections by a user does not satisfy a concurrent connections threshold, the system 100 can output an alert about the total count of concurrent connections by the user. For example, since the 3 concurrent connections by the first user is greater than 2.2, which is 2.0 multiplied by the historical average of 1.1 concurrent connections by the first user, the third monitoring tool 130 outputs an alert about the excessive concurrent connections by the first user which is based on the first user's historical behavior. In another example, since the 1 connection by the second user is less than 2.2, which is 2.0 multiplied by the historical average of 1.1 concurrent connections by the second user, the third monitoring tool 130 continues monitoring other data storage system parameters.

In addition to monitoring each user's concurrent connections, the system 100 can identify a total count of concurrent sessions between the data storage system and any clients which are associated with a user. For example, the third monitoring tool 130 identifies 1,000 concurrent sessions between the data storage system and the first user's client 102. In another example, the third monitoring tool 130 identifies 1 session between the data storage system and the second user's client 104. Concurrent sessions can be temporary and interactive information interchanges between two contemporaneously communicating devices.

Having determined the total count of concurrent sessions by a user, the system 100 can determine whether the total count of concurrent sessions by the user satisfies a concurrent sessions threshold. For example, the third monitoring tool 130 determines whether the 1,000 concurrent sessions by the first user is greater than or equal to 6.0, which is 5.0 multiplied by the historical average of 1.2 concurrent sessions by the first user. In another example, the third monitoring tool 130 determines whether the 1 session by the second user is greater than or equal to 6.0, which is 5.0 multiplied by the historical average of 1.2 concurrent sessions by the second user. Although these examples describe using an allowed variation of a multiplication factor of 5.0 when determining whether the number of a user's concurrent sessions satisfies a historical concurrent sessions threshold, the monitoring tools 126-130 may add, subtract, multiply or divide any value in combination with a historical threshold when making such determinations, and such a value may be calculated in any way.

A concurrent sessions threshold can be the magnitude which must be satisfied by temporary and interactive information interchanges between two contemporaneously communicating devices for a certain result to occur. The concurrent sessions threshold may be based on any number of total counts of concurrent sessions associated with a user and/or a data storage system. For example, in some embodiments a concurrent sessions threshold may be based on the data storage system's most recent and historical number of concurrent sessions rather than based only on a user's most recent and historical number of concurrent sessions.

If the total count of concurrent sessions by a user does not satisfy a concurrent sessions threshold, the system 100 can output an alert about the total count of concurrent sessions by the user. For example, since the 1,000 concurrent sessions by the first user is greater than 6.0, which is 5.0 multiplied by the historical average of 1.2 concurrent sessions by the first user, the third monitoring tool 130 outputs an alert about the historically excessive number of concurrent sessions by the first user, which is based on the first user's historical behavior. In another example, since the 1 session by the second user is less than 6.0, which is 5.0 multiplied by the historical average of 1.2 concurrent sessions by the second user, the third monitoring tool 130 continues monitoring other data storage system parameters. By monitoring the number of concurrent connections and concurrent sessions by a user's client(s), the monitoring tool 130 can identify additional triggers that help to detect hostile activity.

The monitoring tools 126-130 can monitor users' activities/to determine a deviation from an organizational baseline of normal activities related to a single user accessing the data storage system. In case a user starts to write a significant number of encrypted data files to a data storage system, the monitoring tools 126-128 detect this user behavior by determining the file compression success rate for any of the folders to which the user wrote the encrypted data files. The sudden growth in the number of concurrent connections and/or sessions and the storing of encrypted data files on a data storage system enables the monitoring tool 130 to discover anomalous behavior very efficiently. The monitoring tool 130 protects against misbehaving administrators or power users in data storage systems or mistakes that were made by administrators or power users who can either encrypt and steal data or mistakenly encrypt data.

A data storage system typically does not permit the installation of third-party software due to several reasons, such as the effect by proactive security systems on the data storage system's performance, which is the focus of data storage systems. However, the producer of a data storage system can integrate its own monitoring tools 126-130 within the data storage system's storage devices. These monitoring tools 126-130 are native to a data storage system, and do not harm the data storage system's performance because the monitoring tools 126-130 are in a monitoring state virtually all the time, such that the monitoring tools 126-130 are in an alert state only during the small remaining amount of time. Both states of the monitoring tools 126-130 do not harm a data storage system's performance because these monitoring tools 126-130 provide an unauthorized encryption detection system, not a system for responding to any unauthorized encryptions, which requires action by an end user.

Although the following paragraphs describe Dell Corporation's PowerProtect® backup/restore application, Dell Corporation's NetWorker® backup/restore application, and Dell Corporation's Avamar® backup/restore application as examples of the backup/restore application 124, the backup/restore application 124 may be any other type of backup/restore application which provides the backup/restore functionalities described in the Background section. The backup server 110 may be any other type of backup server which provides the backup/restore functionalities described in the Background section.

The backup/restore application 124 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 124 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 124 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types. The storage array 112 may be a Dell Corporation's Powermax, a Dell Corporation XIO, or a Dell Corporation Unity storage array.

The system 100 may include different policies for various data protection levels, such as a "gold" policy for VMware® clients, a "platinum" policy for UNIX® clients, and a "silver" policy for Windows® clients. The gold policy can specify to store 2 backup copies for each VMware® client's application resources onto the first disk 116 for 6 months, store a primary clone of the backup copies onto the second disk 118 for 1 year, and store a secondary clone of the backup copies onto a tape, which is not depicted in FIG. 1, for 5 years. In another example, a policy can provide redundancy by specifying to replicate each full backup copy to three different backups servers, replicate each incremental cumulative backup copy and each incremental differential backup copy to two different backup servers, replicate each archive log backup copy to one additional backup server, and relocate each full backup copy created at the end of the month to cloud tiering 114 for long term retention. Backup copies stored in the cloud tiering 114 have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can specifies the target storage device where backup copies are stored, such as the first disk 116, the second disk 118, the third disk 120, and/or cloud-tiering 114.

Figure 2:
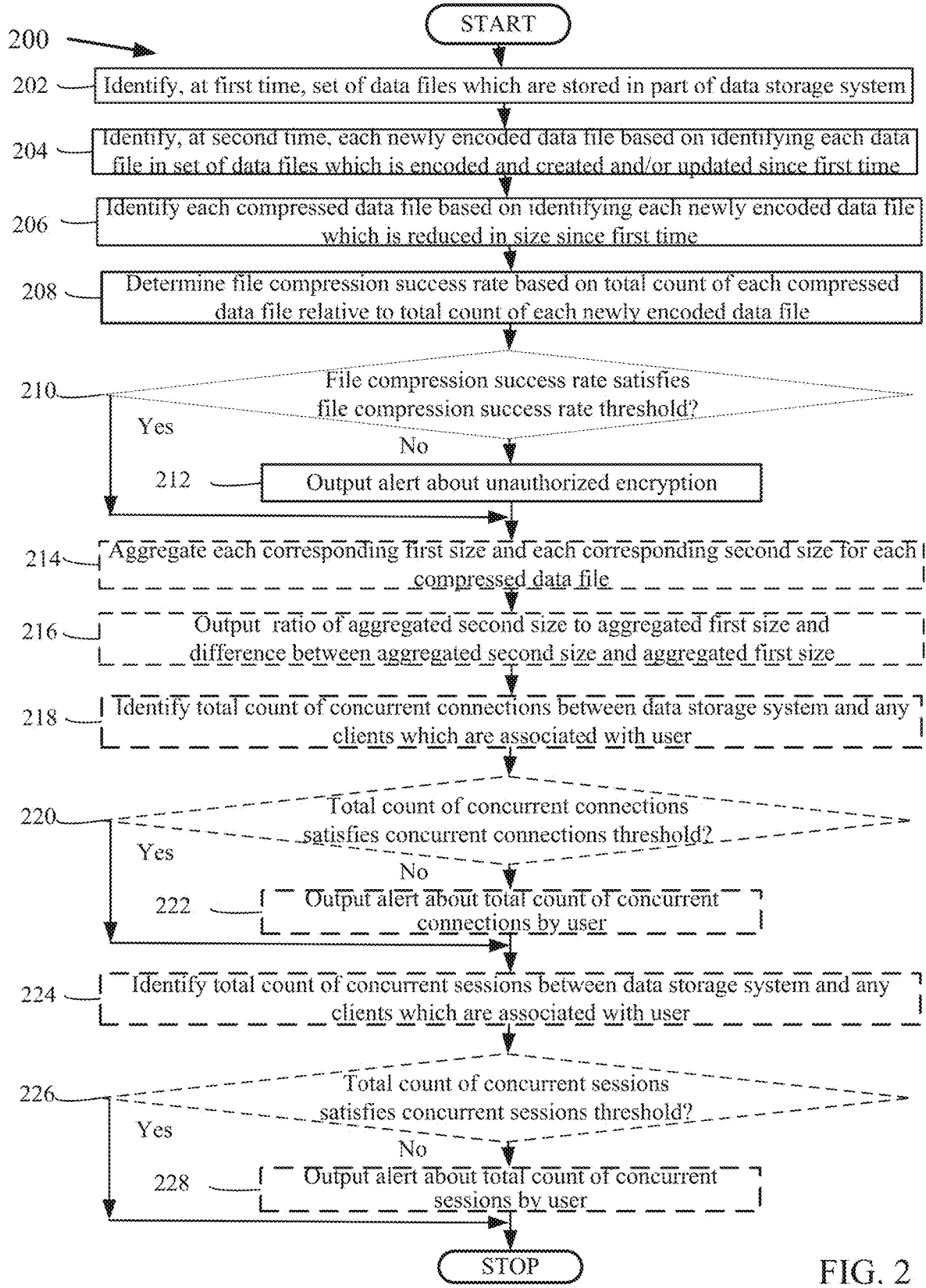
FIG. 2 is a flowchart that illustrates a method of detecting unauthorized encryptions in data storage systems, under an embodiment.

FIG. 2 is a flowchart that illustrates a method for detecting unauthorized encryptions in data storage systems, under an embodiment. Flowchart 200 illustrates method acts illustrated as flowchart blocks for certain steps involved in the backup server 110, the clients 102-108, the storage array 112, and the cloud tier 114, and/or between the clients 102-108 and the backup server 110, the storage array 112, and the cloud tier 114 of FIG. 1.

At a first time, a set of data files are identified as stored in a part of a data storage system, block 202. A system identifies files that might subsequently be compressed or encrypted. For example, and without limitation, this can include the first monitoring tool 126 identifying ten data files which are stored in the first data file folder 132 in a data storage system at 9:00 A.M.

After identifying a set of data files in a folder at a first time, at a second time each newly encoded data file is identified in the set of data files based on identifying each data file in the set of data files which is both encoded and also created or updated since the first time, block 204. The system identifies some new files that were compressed or encrypted. By way of example and without limitation, this can include the first monitoring tool 126 identifying ten newly encoded data files in the first folder 132 by identifying at 9:01 A.M that all ten data files were created or updated in the first folder 132 since 9:00 A.M. and were also categorized as encoded, which means encrypted or compressed.

Following the identification of each newly encoded data file in a set of data files, each compressed data file is identified in the set of data files based on identifying each newly encoded data file which is reduced in size in the set of data files since the first time, block 206. The system differentiates between data files that were encrypted and data files that were compressed based on any encoded files' reduction in size. In embodiments, this can include the first monitoring tool 126 identifying zero compressed data files by identifying that none of the ten newly encoded data files in the first data files folder 132 was reduced in size since 9:00 A.M., based on a comparison to the ten newly encoded files' previous sizes.

Having identified each compressed data file in a set of data files, a file compression success rate is determined for the set of data files based on the total count of each compressed data file in the set of data files relative to the total count of each newly encoded data file in the set of data files, block 208. The system determines the percentage of encoded data files, which were either compressed or encrypted, which were reduced in size. For example, and without limitation, this can include the first monitoring tool 126 determining a file compression success rate of 0% for the first data files folder 132 by dividing zero, which is the number of the compressed data files in the first data files folder 132, by ten, which is the number of the newly encoded data files in the first data files folder 132.

After determining a file compression success rate for a set of data files, whether the file compression success rate for the set of data files satisfies a file compression success rate threshold is determined, block 210. The system compares a currently identified rate of compressing data files against an expected rate of compressing data files. By way of example and without limitation, this can include the first monitoring tool 126 determining whether the file compression success rate of 0% for the first data files folder 132 is greater than or equal to 89.99%, which is the historical average of the file compression success rate of 99.99% for the first data files folder 132 minus 10%. If the file compression success rate for the set of data files does not satisfy the file compression success rate threshold, the method 200 continues to block 212 to output an alert about an unauthorized encryption. If the file compression success rate for the set of data files satisfies the file compression success rate threshold, the method 200 proceeds to block 214 to possibly report on data compression.

If a file compression success rate for a set of data files does not satisfy a file compression success rate threshold, an alert is output about an unauthorized encryption, block 212. The system outputs alert for unauthorized encryptions. For example, and without limitation, this can include the first monitoring tool 126 outputting an alert about ten potential unauthorized encryptions of data files in the first data files folder 132, because the file compression success rate of 0% for the first data files folder 132 is less than 89.99%, which is the historical average of the file compression success rate threshold of 99.99% for the first data files folder 132 minus 10%, which indicates that the ten newly encoded data files were ten unauthorized encryptions of data files.

In addition to identifying each compressed data file, each corresponding first size and each corresponding second size are optionally aggregated for each compressed data file, block 214. The system can determine the compressed data files' sizes before and after compression. For example, and without limitation, this can include the second monitoring tool 128 determining that the five compressed data files in the second data files folder 134 require 1 Megabyte (MB) of storage on the first disk 116, and as five uncompressed files originally required 3 MB of storage on the first disk 116, Following the aggregation of each corresponding first size and each corresponding second size for each compressed data file, a ratio of the aggregated second size to the aggregated first size and a difference between the aggregated second size and the aggregated first size are optionally output, block 216. The system can calculate the data storage size saved in a folder due to data compression and the data compression's ratio. By way of example and without limitation, this can include the second monitoring tool 128 determining that the data compression in the second data files folder 134 saved 2 MB of storage on the first disk 116 at a 3:1 compression ratio.

In addition to monitoring data file changes, a total count can be optionally identified of concurrent connections between the data storage system and any clients which are associated with a user, block 218. The system can monitor each user's concurrent connections to a data storage system. In embodiments, this can include the third monitoring tool 130 identifying 3 concurrent connections between the data storage system and the first user's client 102.

Following the determination of a total count of concurrent connections between a data storage system and a user, whether the total count of the concurrent connections satisfies a concurrent connections threshold is optionally determined, block 220. The system can compare a user's number of concurrent connections to the user's historical number of concurrent connections. For example, and without limitation, this can include the third monitoring tool 130 determining whether the 3 concurrent connections by the first user is greater than or equal to 2.2, which is 2.0 multiplied by the historical average of 1.1 concurrent connections by the first user. If the total count of concurrent connections by a user does not satisfy a concurrent connections threshold, the method 200 continues to block 222 to output an alert about the total count of concurrent connections by the user. If the total count of concurrent connections by a user satisfies a concurrent connections threshold, the method 200 proceeds to block 224 to monitor a user's concurrent sessions.

If the total count of concurrent connections by a user does not satisfy a concurrent connections threshold, an alert may be optionally about the total count of concurrent connections by the user, block 222. The system can output an alert about a user with a historically excessive number of connections to a data storage system. By way of example and without limitation, this can include the third monitoring tool 130 outputting an alert about the excessive number of concurrent connections by the first user to the data storage system, based on the first user's historical behavior, which indicated that the 3 concurrent connections by the first user is greater than 2.2, which is 2.0 multiplied by the historical average of 1.1 concurrent connections by the first user.

In addition to monitoring each user's concurrent connections to a data storage system, the total count is optionally identified of concurrent sessions between the data storage system and any clients which are associated with a user, block 224. The system can monitor each user's concurrent sessions interacting with a data storage system. In embodiments, this can include the third monitoring tool 130 identifying 1,000 concurrent sessions between the data storage system and the first user's client 102.

Having identified the total count of concurrent sessions between a data storage system and any clients which are associated with a user, whether the total count of concurrent sessions satisfies a concurrent sessions threshold may be optionally determined, block 226. The system can compare a user's number of concurrent sessions to the user's historical number of concurrent sessions. For example, and without limitation, this can include the third monitoring tool 130 determining whether the 1,000 concurrent sessions by the first user is greater than or equal to 6.0, which is 5.0 multiplied by the historical average of 1.2 concurrent sessions by the first user. If the total count of concurrent sessions by a user does not satisfy a concurrent sessions threshold, the method 200 can continue to block 228 to output an alert about the total count of concurrent sessions by the user. If the total count of concurrent sessions by a user satisfies a concurrent sessions threshold, the method 200 terminates, which enables the continued monitoring of other data storage system parameters.

If the total count of concurrent sessions by a user does not satisfy a concurrent sessions threshold, an alert may be optionally output about the total count of concurrent sessions by the user, block 228. The system can output an alert about a user with a historically excessive number of sessions interacting with a data storage system. By way of example and without limitation, this can include the third monitoring tool 130 outputting an alert about excessive concurrent sessions by the first user, which is based on the first user's historical behavior which indicates that the 1,000 concurrent sessions by the first user is greater than 6.0, which is 5.0 multiplied by the historical average of 1.2 concurrent sessions by the first user.

Although FIG. 2 depicts the blocks 202-224 occurring in a specific order, the blocks 202-224 may occur in another order. In other implementations, each of the blocks 202-224 may also be executed in combination with other blocks and/or some blocks may be divided into a different set of blocks.

Figure 3:
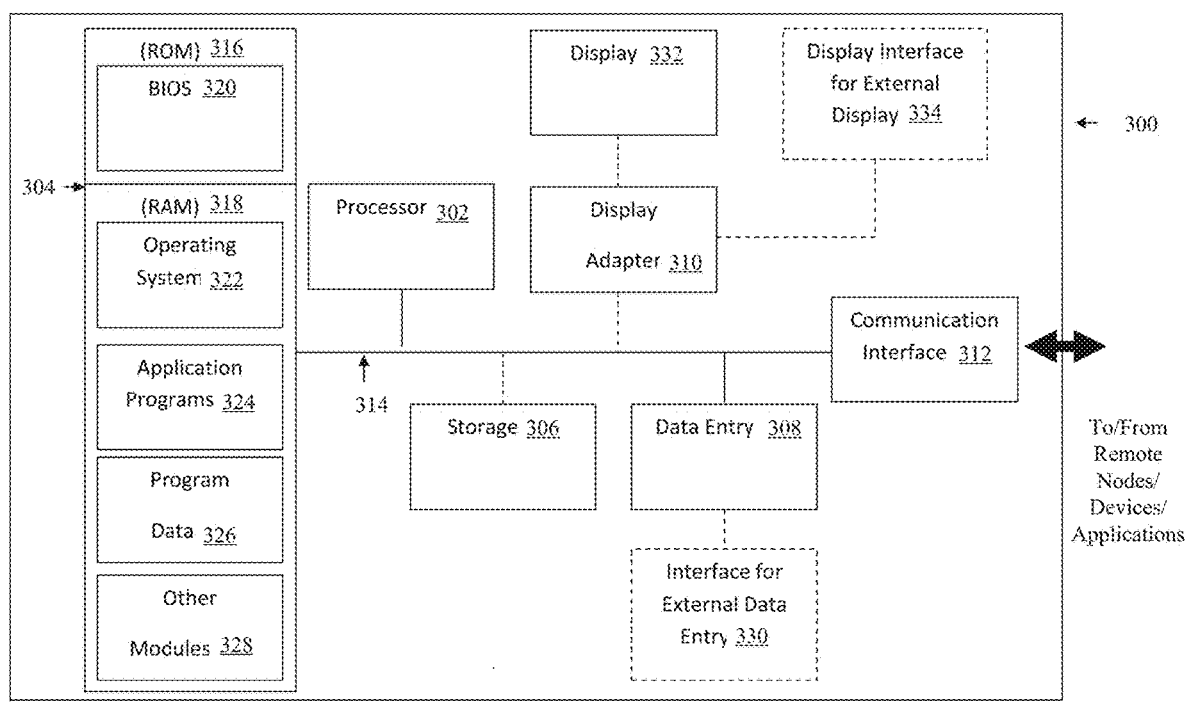
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random-access memory (RAM) 318. The memory 304 may be configured to store program instructions and data during operation of the hardware device 300. In various embodiments, the memory 304 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330.

By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device, or other common network node, and typically includes many or all the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

The arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for detecting unauthorized encryptions in data storage systems, comprising:
    one or more processors; and
    a non-transitory computer readable medium storing a plurality of instructions, which when executed, cause the one or more processors to:
        identify, at a first time and over a computer network, a set of data files which are stored in a part of a data storage system;
        identify, at a second time, each data file in the set of data files that has been either created and encoded since the first time or modified and encoded since the first time, each of the identified data files being a newly encoded data file, the first time being after a second time;
        identify each newly encoded data file which is reduced in size since the first time based on a comparison of a previous size of each of the newly encoded data file, each of the identified newly encoded data files being a compressed data file;
        determine a file compression success rate based on a total count of each of the compressed data file relative to a total count of each of the newly encoded data file;
        determine whether the file compression success rate satisfies a file compression success rate threshold, wherein the file compression success rate threshold is based on at least one file compression success rate associated with at least one of a user or the part of the data storage system, and
        output an alert about an unauthorized encryption in response to a determination that the file compression success rate does not satisfy the file compression success rate threshold.

2. The system of claim 1, wherein identifying each compressed data file which is reduced in size since the first time comprises identifying a corresponding first size at the first time and a corresponding second size at a second time, and the plurality of instructions further causes the processor to:
    aggregate each corresponding first size and each corresponding second size, and
    output a ratio of the aggregated second size to the aggregated first size and a difference between the aggregated second size and the aggregated first size.

3. The system of claim 1, wherein the plurality of instructions further causes the processor to:
    identify a total count of concurrent connections between the data storage system and any clients which are associated with a user;
    determine whether the total count of concurrent connections satisfies a concurrent connections threshold, and
    output an alert about the total count of concurrent connections by the user in response to a determination that the total count of concurrent connections does not satisfy the concurrent connections threshold.

4. The system of claim 3, wherein the concurrent connections threshold is based on at least one total count of concurrent connections associated with at least one of a user and the data storage system.

5. The system of claim 1, wherein the plurality of instructions further causes the processor to:
    identify a total count of concurrent sessions between the data storage system and any clients which are associated with a user;
    determine whether the total count of concurrent sessions satisfies a concurrent sessions threshold, and
    output an alert about the total count of concurrent sessions by the user in response to a determination that the total count of concurrent sessions does not satisfy the concurrent sessions threshold.

6. The system of claim 5, wherein the concurrent sessions threshold is based on at least one total count of concurrent sessions associated with at least one of a user and the data storage system.

7. A computer-implemented method for detecting unauthorized encryptions in data storage systems, the computer-implemented method comprising:
    identifying, at a first time and over a computer network, a set of data files which are stored in a part of a data storage system;
    identifying, at a second time, each data file in the set of data files that has been either created and encoded since the first time or modified and encoded since the first time, each of the identified data files being a newly encoded data file, the first time being after a second time;
    identifying each newly encoded data file which is reduced in size since the first time based on a comparison of a previous size of each of the newly encoded data file, each of the identified newly encoded data files being a compressed data file;
    determining a file compression success rate based on a total count of each of the compressed data file relative to a total count of each of the newly encoded data file;
    determining whether the file compression success rate satisfies a file compression success rate threshold, wherein the file compression success rate threshold is based on at least one file compression success rate associated with at least one of a user or the part of the data storage system, and outputting an alert about an unauthorized encryption in response to a determination that the file compression success rate does not satisfy the file compression success rate threshold.

8. The computer-implemented method of claim 7, wherein identifying each compressed data file which is reduced in size since the first time comprises identifying a corresponding first size at the first time and a corresponding second size at a second time, and the computer-implemented method further comprises:
aggregating each corresponding first size and each corresponding second size, and
outputting a ratio of the aggregated second size to the aggregated first size and a difference between the aggregated second size and the aggregated first size.

9. The computer-implemented method of claim 7, wherein the computer-implemented method further comprises:
identifying a total count of concurrent connections between the data storage system and any clients which are associated with a user;
determining whether the total count of concurrent connections satisfies a concurrent connections threshold, and
outputting an alert about the total count of concurrent connections by the user in response to a determination that the total count of concurrent connections does not satisfy the concurrent connections threshold.

10. The computer-implemented method of claim 9, wherein the concurrent connections threshold is based on at least one total count of concurrent connections associated with at least one of a user and the data storage system.

11. The computer-implemented method of claim 7, wherein the computer-implemented method further comprises:
identifying a total count of concurrent sessions between the data storage system and any clients which are associated with a user;
determining whether the total count of concurrent sessions satisfies a concurrent sessions threshold, and
outputting an alert about the total count of concurrent sessions by the user in response to a determination that the total count of concurrent sessions does not satisfy the concurrent sessions threshold.

12. The computer-implemented method of claim 11, wherein the concurrent sessions threshold is based on at least one total count of concurrent sessions associated with at least one of a user and the data storage system.

13. A computer program product, comprising a non-transitory computer-readable medium having a computer-readable program code embodied therein to be executed by one or more processors, the program code including instructions to:
identify, at a first time and over a computer network, a set of data files which are stored in a part of a data storage system;
identify, at a second time, each data file in the set of data files that has been either created and encoded since the first time or modified and encoded since the first time, each of the identified data files being a newly encoded data file, the first time being after a second time;
identify each newly encoded data file which is reduced in size since the first time based on a comparison of a previous size of each of the newly encoded data file, each of the identified newly encoded data files being a compressed data file;
determine a file compression success rate based on a total count of each of the compressed data file relative to a total count of each of the newly encoded data file;
determine whether the file compression success rate satisfies a file compression success rate threshold, wherein the file compression success rate threshold is based on at least one file compression success rate associated with at least one of a user or the part of the data storage system, and
output an alert about an unauthorized encryption in response to a determination that the file compression success rate does not satisfy the file compression success rate threshold.

14. The computer program product of claim 13, wherein identifying each compressed data file which is reduced in size since the first time comprises identifying a corresponding first size at the first time and a corresponding second size at a second time, and the program code includes further instructions to:
aggregate each corresponding first size and each corresponding second size, and
output a ratio of the aggregated second size to the aggregated first size and a difference between the aggregated second size and the aggregated first size.

15. The computer program product of claim 13, wherein the program code includes further instructions to:
identify a total count of concurrent connections between the data storage system and any clients which are associated with a user;
determine whether the total count of concurrent connections satisfies a concurrent connections threshold, and
output an alert about the total count of concurrent connections by the user in response to a determination that the total count of concurrent connections does not satisfy the concurrent connections threshold.

16. The computer program product of claim 15, wherein the concurrent connections threshold is based on at least one total count of concurrent connections associated with at least one of a user and the data storage system.

17. The computer program product of claim 13, wherein the program code includes further instructions to:
identify a total count of concurrent sessions between the data storage system and any clients which are associated with a user;
determine whether the total count of concurrent sessions satisfies the concurrent sessions threshold, and
output an alert about the total count of concurrent sessions by the user in response to a determination that the total count of concurrent sessions does not satisfy a concurrent sessions threshold, wherein the concurrent sessions threshold is based on at least one total count of concurrent sessions associated with at least one of a user and the data storage system.

* * * * *